UNITED STATES PATENT OFFICE.

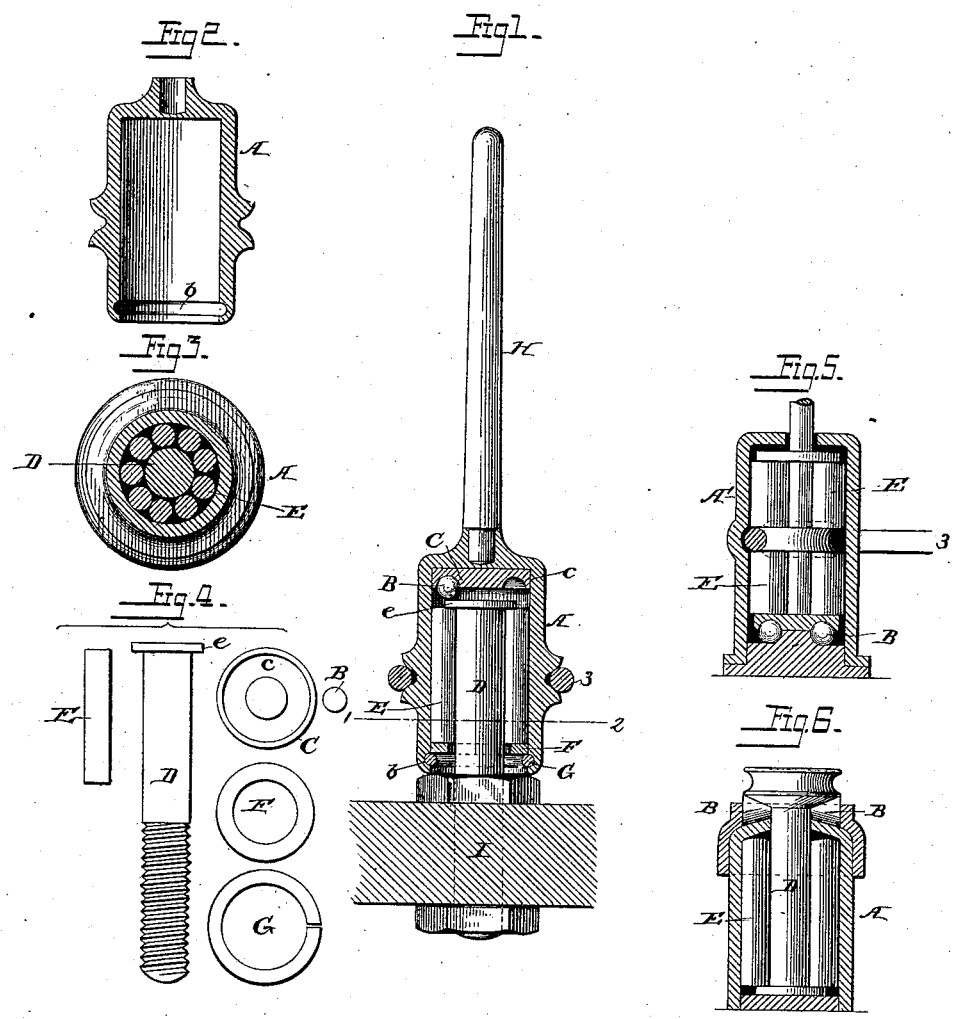

GEORGE A. METCALF, OF WOONSOCKET, RHODE ISLAND, ASSIGNOR OF ONE-HALF TO SIMON W. WARDWELL, JR., OF SAME PLACE.

SPINNING-SPINDLE AND SUPPORT THEREFOR.

SPECIFICATION forming part of Letters Patent No. 373,841, dated November 29, 1887.

Application filed January 7, 1886. Serial No. 187,834. (No model.)

*To all whom it may concern:*

Be it known that I, GEORGE A. METCALF, a citizen of the United States, and a resident of Woonsocket, Providence county, and State of Rhode Island, have invented certain new and useful Improvements in Spinning-Spindles and Supports therefor, of which the following is a specification.

My invention relates to supports for vertical spindles; and it consists of an anti-friction bearing therefor constructed substantially as herein set forth and described.

Figure 1 illustrates, in part elevation, part section, one method of applying my improved anti-friction bearing to a spindle. Fig. 2 is a detached section of the spindle-case; Fig. 3, a section on the line 1 2, Fig. 1. Fig. 4 represents the various parts of the bearing detached. Figs. 5 and 6 are vertical sectional elevations illustrating modifications.

The vertical spindle is provided with a bearing which rests upon a series of anti-friction spherical rolls traveling in a circular course upon a horizontal or substantially horizontal plane, the said rolls thus supporting the spindle vertically; and to afford a lateral support for the spindle I prefer to use a second series of cylindrical rolls arranged in a circle around and bearing against the outside of the spindle or some portion thereof. By supporting the spindle as thus described the frictional resistance to its revolution is reduced to a minimum, while the lateral pressure of the driving-band, instead of forcing the spindle against a fixed bearing with a great increase of friction, as usual, does not occasion any material resistance to the revolution of the spindle.

I have shown in the drawings a number of different arrangements which may be employed in carrying out my invention; but it will be understood that these arrangements may be variously modified, while yet securing a rolling support for the spindle against both its vertical and lateral pressure.

In the arrangement shown in Figs. 1 to 4 a spindle, H, is secured to or forms part of a hollow case, A, grooved externally to constitute a whirl receiving the driving-band 3, and the rolls B, which support the spindle vertically, are spherical, and have their bearings upon the hardened end or upon an enlargement, e, at the end of the bolster D and in a groove, c, at the under side of a hardened-metal disk, C, fitting within the case A at the top thereof. The spindle has its lateral support against a series of cylindrical rolls, E, intervening between the inner face of the casing A and the side of the bolster D, and surrounding the latter, and resting at their lower ends upon a flange or ring, F, within the case, a detachable ring being shown, which is held in place by means of a split ring, G, fitting detachably a groove, b, near the lower end of the case. As the spindle turns it travels upon the rolling lateral bearings, the spherical rolls B revolving between the traveling bearing of the spindle and the fixed bearing of the bolster, and supporting the dead weight of the spindle and maintaining it in its proper vertical position, while the rolls E not only prevent any tilting of the spindle, but also serve as anti-friction bearings to resist the lateral thrust of the spindle resulting from the lateral drag of the driving-belt 3. By thus supporting the spindle so that it moves wholly upon traveling bearings I avoid the necessity of using any lubricating material to reduce friction, as the friction is reduced to a minimum without the use of a lubricant, and I thereby avoid the objections incident to the presence of oil, &c., in the manufacture of many classes of goods, and also avoid the possibility of the spindle being retarded by the gumming of the oil and the accumulation of any dust or fiber upon the oil upon the bearings.

In Fig. 5 I have shown the horizontal bearing of the spindle at the lower end thereof, in which case there are two sets of rolls—one cylindrical and the other vertical—and where the wharf or whirl must be near the lower bearing it may be arranged with a set of cylindrical rolls above and another set below it, as shown in Fig. 5, the vertical rolls taking their bearing against the inside of a fixed casing, A', which is perforated at the sides for the passage of the band 3.

In Fig. 6 I have shown the rolls B, which support the spindle vertically, as being conical in form, the bearing-faces being accordingly inclined.

The construction shown in Figs. 1 to 4 is peculiarly efficient, inasmuch as the bearing-faces are effectually covered and the access of dust prevented, while the main support of the spindle is the bolster.

In the construction shown in Figs. 1 to 4 the parts are put together as follows: The spindle H is first fastened to the case A, which is then inverted, and the disk C is dropped into the same with the grooved side uppermost. The rolls B are then dropped into the annular groove $c$, after which the inverted bolster is placed with its head upon the roll, and the rolls E are then inserted between the side of the bolster and the case, after which the ring F is placed against the end of the roll, and the ring G is compressed and sprung into the groove $b$. The upper nut is then placed upon the threaded end of the bolster, and the latter is passed through the opening in the rail I, and the whole is secured firmly by screwing the lower nut firmly against the bottom of the rail. The spindle is removed from its bearings by reversing the above-described operations.

Without limiting myself to the precise construction and arrangement of parts shown, I claim—

1. The combination of the spindle enlarged at the lower end to form a case, a bolster extending into the case, a series of anti-friction rolls between the upper end of the bolster and a bearing on the spindle, and a second series of anti-friction rolls between the side of the bolster and the case, substantially as set forth.

2. The combination of the bolster having an enlarged end, the spindle, casing A, detachable grooved disk C, rolls B and E, and detachable ring F, substantially as set forth.

3. The spindle enlarged and hollowed at its lower end to form a casing, in combination with the fixed bearing D and vertically-extending anti-friction bearings arranged between the casing and the fixed bearing D within the same, substantially as described.

4. A rotatable spindle enlarged and hollowed at its lower end to form a casing and grooved to form a whirl, in combination with the non-rotatable bearing D and anti-friction rollers within the casing, between the latter and the non-rotatable bearing D, substantially as described.

5. A spindle, a roller-receiving case secured to said spindle, and a removable grooved disk upon the spindle within said case, in combination with a series of cylindrical and spherical rollers and a fixed support therefor, substantially as described.

In testimony whereof I have signed my name to this specification in the presence of two subscribing witnesses.

GEORGE A. METCALF.

Witnesses:
 JEFFERSON ALDRICH,
 CHAS. H. REEVES.